United States Patent [19]

Freeberg

[11] 4,114,932
[45] Sep. 19, 1978

[54] MOTOR VEHICLE WHEEL TRACK SANDING DEVICE

[76] Inventor: Fred Freeberg, P.O. Box 34391, Omaha, Nebr. 68134

[21] Appl. No.: 812,914

[22] Filed: Jul. 5, 1977

[51] Int. Cl.$^2$ ............................ B60B 39/06; B60B 39/10
[52] U.S. Cl. ............................................... 291/33; 222/413; 291/38
[58] Field of Search ................... 291/33, 38, 39, 40, 291/23; 222/412, 413

[56] References Cited

U.S. PATENT DOCUMENTS

| 1,654,739 | 1/1928 | Kraus | 291/33 |
| 2,999,711 | 9/1961 | Sturmer | 291/38 |
| 3,722,715 | 3/1973 | Young | 222/413 |
| 3,756,434 | 9/1973 | Teske | 222/413 |
| 3,938,835 | 2/1976 | Lee | 291/38 |

FOREIGN PATENT DOCUMENTS

| 31,275 | 10/1926 | France | 291/33 |
| 483,011 | 9/1929 | Fed. Rep. of Germany | 291/33 |

*Primary Examiner*—Trygve M. Blix
*Assistant Examiner*—Reinhard J. Eisenzopf
*Attorney, Agent, or Firm*—Zarley, McKee, Thomte, Voorhees & Sease

[57] ABSTRACT

A motor vehicle wheel track sanding device including a sand storage tank, a hopper mounted over a wheel of a motor vehicle, a pipe connecting the interior of the hopper to the storage chamber, an auger disposed within the pipe for transferring the sand from the storage tank to the hopper, and a motor for rotating the auger.

1 Claim, 2 Drawing Figures

MOTOR VEHICLE WHEEL TRACK SANDING DEVICE

BACKGROUND OF THE INVENTION

1. Field of the Invention

The present invention relates to anti-skid devices for use in conjunction with automobiles and other motor vehicles, and more particularly, to a motor vehicle wheel track sanding device.

2. Description of the Prior Art

The use of sand to increase the traction of motor vehicle wheels on an ice, snow, or other slick surfaces is well known in the art. Several apparatuses have been proposed for releasing measured amounts of sand adjacent to a motor vehicle tire. A primary disadvantage of presently known devices is that they all require the receptacle for storing the sand to be disposed directly adjacent to the wheel of a motor vehicle. This is a serious disadvantage since the placement of a storage chamber of sand directly adjacent to a motor vehicle wheel precludes use of these devices with most presently manufactured automobiles and also would require major redesigning for incorporation in automobiles to be built in the future.

U.S. Pat. Nos. 3,774,945, 3,827,736, and 3,889,991 are typical of the presently known sand depositing apparatuses.

The present invention overcomes the problems associated with the prior art by providing a motor vehicle wheel track sanding device wherein the sand supply to be dispensed therefrom is positioned at a location remote to the location of the wheel of an automobile thereby permitting storage of sand in a convenient area of the motor vehicle which can accommodate a storage chamber.

SUMMARY OF THE INVENTION

Therefore, a primary object of the present invention is to provide a motor vehicle track sanding device to improve the traction of motor vehicle wheels on slick surfaces.

A further object of the present invention is to provide a motor vehicle wheel track sanding device wherein the sand storage tank thereof may be positioned at a location remote to the wheels of the motor vehicle.

A still further object of the present invention is to provide a motor vehicle wheel track sanding device which may be remotely controlled from the dashboard of a motor vehicle.

Still another object of the present invention is to provide a motor vehicle wheel track sanding device which is readily adaptable for installation in automobiles, trucks, and other motor vehicles.

Still another further object of the present invention is to provide a motor vehicle wheel track sanding device which may be installed on presently existing motor vehicles.

Another further object of the present invention is to provide a motor vehicle wheel track sanding device which is simple in design, inexpensive to manufacture, and durable.

These objects, as well as further objects and advantages, of the present invention will become readily apparent after reading the description of a non-limiting illustrative embodiment and the accompanying drawing.

A motor vehicle wheel track sanding device according to the principles of the present invention includes a sand storage tank forming a storage chamber therein for sand; at least one hopper mounted over a wheel of the motor vehicle; a pipe connecting the interior of the hopper with the storage chamber; auger means rotatably disposed within the pipe, the rotation of the auger means transporting the sand disposed within the storage chamber to the hopper; and means for rotating the auger.

BRIEF DESCRIPTION OF THE DRAWING

In order that the present invention may be more fully understood it will now be described, by way of example, with reference to the accompanying drawing in which.

DESCRIPTION OF THE PREFERRED EMBODIMENT

Figure 1:
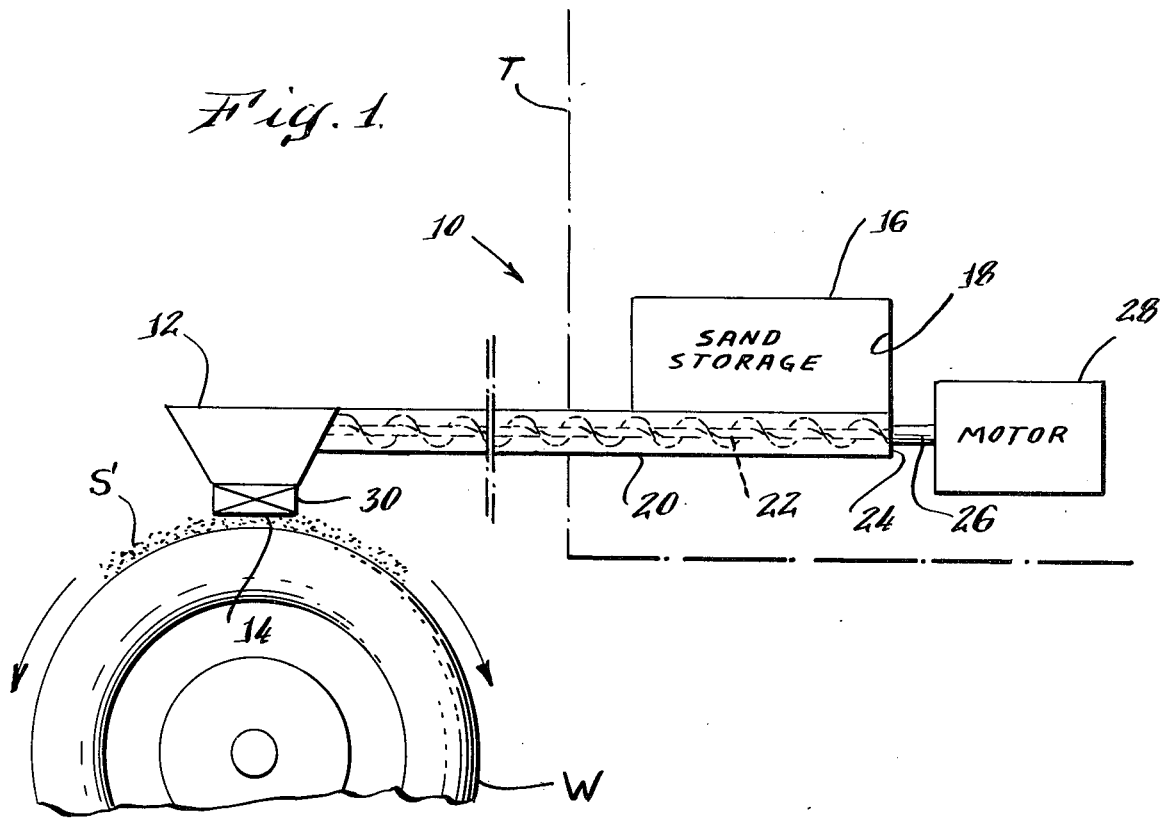
FIG. 1 is a combined pictorial representation and schematic view of the preferred embodiment incorporating the principles of the present invention therein.

Referring now to the figures, and more particularly to FIG. 1 thereof, there is illustrated therein a motor vehicle wheel track sanding device 10. The motor vehicle wheel track sanding device 10 includes a hopper 12 which is mounted directly above a wheel W of a motor vehicle. The hopper 12 provides a discharge opening 14. Mounted within the trunk compartment T of a motor vehicle is a sand storage tank 16. Although described as mounted within a vehicle trunk, the sand storage tank 16 may be located at any position which is readily adaptable for the accommodation of the tank 16.

The hopper 12 which is hollow, is connected to a sand storage chamber 18 formed by the sand storage tank 16 by a pipe 20. The pipe 20 connects the sand storage chamber 18 with the interior of the hopper 12.

An auger 22 is rotatably disposed within the pipe 20. The auger 22 is fixedly secured on an end 24 thereof to a shaft 26 of a motor 28. When the motor is activated, as hereinafter described, rotation of the auger draws sand S from the sand storage chamber 18 through the interior of the pipe 20 and into the hollow interior of the hopper 12.

An electrically controlled valve 30 is mounted on the hopper 12 over the discharge opening 14 thereof and selectively releases the sand S when the electrically controlled valve 30 is activated.

Figure 2:
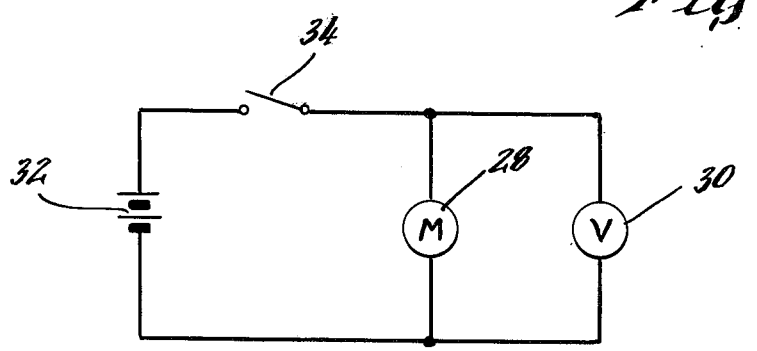
FIG. 2 is a schematic representation of the control circuit of the preferred embodiment.

FIG. 2 illustrates schematically a power source 32 connected in parallel to the motor 28 of the electrically controlled valve 30. A switch 34 is included to selectively supply power from the power source 32, simultaneously, to the motor 28 and the valve 30. The switch 34 is preferably located on the dashboard of a motor vehicle with the power source 32 being the battery thereof. When the switch 34 is closed, the motor is activated turning the auger 22. Resultantly, sand S is drawn from the storage tank 16 through the pipe 20 and is deposited in the hopper 12. At the same time that the motor 28 is activated, the electrically controlled valve 30 is also activated and therefore opens to permit the sand S to fall through the discharge opening 14 onto the wheel W.

When a sufficient quantity of sand S has been deposited upon the wheel W and the track formed thereby, the user merely opens the switch 34 to stop the rotation of the motor 28 and instantly close the electrically operated valve 30. The electrically operated valve 30 may take the form of any such devices well known in the art. Since the motor 28 does not stop instantly, and relies upon friction to cease rotation, sand will continue to enter the hopper 12 after the valve 30 has been closed. As a result, when the switch 34 is initially activated, the first amount of sand S leaving the hopper 12 will be of a greater quantity than the flow provided when the system is in operation. This increased supply of sand will facilitate the initial traction enhancement of the present invention.

Therefore, a primary advantage of the present invention is to provide a motor vehicle wheel track sanding device to improve the traction of motor vehicle wheels on slick surfaces.

A further advantage of the present invention is to provide a motor vehicle wheel track sanding device wherein the sand storage tank thereof may be positioned at a location remote to the wheels of the motor vehicle.

A still further advantage of the present invention is to provide a motor vehicle wheel track sanding device which may be remotely controlled from the dashboard of a motor vehicle.

Still another advantage of the present invention is to provide a motor vehicle wheel track sanding device which is readily adaptable for installation in automobiles, trucks, and other motor vehicles.

Still another further advantage of the present invention is to provide a motor vehicle wheel track sanding device which may be installed on presently existing motor vehicles.

Another further advantage of the present invention is to provide a motor vehicle wheel track sanding device which is simple in design, inexpensive to manufacture, and durable.

It will be understood that various changes in the details, materials, arrangements of parts and operation conditions which have been herein described and illustrated in order to explain the nature of the invention may be made by those skilled in the art within the principles and scope of the invention.

Having thus set forth the nature of the invention, what is claimed is:

1. A motor vehicle wheel track sanding device comprising:
    a sand storage tank forming a storage chamber therein for sand;
    at least one hopper mounted over a wheel of said motor vehicle;
    a pipe connecting the interior of said hopper with said storage chamber;
    auger means rotatably disposed within said pipe, the rotation of said auger means transporting sand disposed within said storage chamber to said hopper;
    means for rotating said auger;
    said hopper having a sand discharge opening disposed above said wheel and generally longitudinally centered relative to the wheel whereby sand is discharged from said opening onto said wheel and is directed forwardly or rearwardly of the wheel depending on the direction of rotation of said wheel;
    valve means on said discharge opening for selectively releasing sand from said hopper;
    valve control means remotely situated relative to said hopper and operatively connected to said valve means for opening and closing said discharge opening;
    electrical circuit means for activating said rotating means and said valve means simultaneously; and
    said electrical circuit means being operative for deactivating said rotating means and said valve means simultaneously, said valve means being closed upon deactivation and said rotating means and auger being slowed to a stop by friction upon deactivation of said rotating means whereby, subsequent to deactivation, a supply of sand is formed at said discharge opening which is closed by said valve means.

* * * * *